US010475256B2

(12) United States Patent
Chowdhury et al.

(10) Patent No.: US 10,475,256 B2
(45) Date of Patent: Nov. 12, 2019

(54) METHODS AND SYSTEMS FOR AUTOMATIC VEHICLE MAINTENANCE SCHEDULING

(71) Applicant: Tata Consultancy Services Limited, Mumbai (IN)

(72) Inventors: Arijit Chowdhury, Kolkata (IN); Tapas Chakravarty, Kolkata (IN); Tanushree Banerjee, Kolkata (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/371,930

(22) Filed: Dec. 7, 2016

(65) Prior Publication Data
US 2017/0161964 A1 Jun. 8, 2017

(30) Foreign Application Priority Data
Dec. 8, 2015 (IN) .......................... 4636/MUM/2015

(51) Int. Cl.
*G07C 5/00* (2006.01)
*G07C 5/02* (2006.01)

(52) U.S. Cl.
CPC .............. *G07C 5/006* (2013.01); *G07C 5/02* (2013.01)

(58) Field of Classification Search
None
See application file for complete search history.

(56) References Cited

U.S. PATENT DOCUMENTS

| 5,508,918 A * | 4/1996 | Gioutsos ............... B60R 21/013 180/282 |
| 5,521,822 A * | 5/1996 | Wang ................ B60R 21/0132 180/282 |
| 9,324,192 B2 | 4/2016 | Chakravarty et al. |
| 2010/0292894 A1 * | 11/2010 | Essaili .................. B60W 40/09 701/37 |
| 2011/0307188 A1 * | 12/2011 | Peng .................. G06Q 10/0639 702/33 |
| 2014/0018974 A1 | 1/2014 | Okita et al. |
| 2015/0019067 A1 | 1/2015 | Chakravarty et al. |

(Continued)

*Primary Examiner* — Todd M Melton
*Assistant Examiner* — Jason R Roberson
(74) *Attorney, Agent, or Firm* — Finnegan, Henderson, Farabow, Gattett & Dunner LLP

(57) ABSTRACT

The disclosure generally relates to vehicle maintenance and more particularly to methods and systems for automatic vehicle maintenance scheduling. The method comprises obtaining acceleration data at a fixed sampling rate of a moving vehicle when the moving vehicle attains at least a pre-determined speed for a pre-determined time from start of the moving vehicle. The obtained acceleration data is processed to generate jerk energy values at predetermined intervals. Speed normalized jerk energy is computed based on an average of the generated jerk energy values and average speed of the moving vehicle. A relationship between journey number and the computed speed normalized jerk energy is computed. A vehicle maintenance indicator based on the computed relationship between the journey number and the computed speed normalized jerk energy is finally computed.

3 Claims, 2 Drawing Sheets

(56) References Cited

U.S. PATENT DOCUMENTS

2015/0149017 A1* 5/2015 Attard ................ B60W 30/182
                                                        701/23
2015/0258993 A1* 9/2015 Chakravarty ....... B60W 30/143
                                                        701/93
2017/0124779 A1* 5/2017 Westendorf ............ G07C 5/085

* cited by examiner

METHODS AND SYSTEMS FOR AUTOMATIC VEHICLE MAINTENANCE SCHEDULING

PRIORITY CLAIM

This U.S. patent application claims priority under 35 U.S.C. § 119 to: India Application No. 4636/MUM/2015, filed on Dec. 8, 2015. The entire contents of the aforementioned application are incorporated herein by reference.

TECHNICAL FIELD

The disclosure related generally to vehicle maintenance and more particularly to methods and systems for automatic vehicle maintenance scheduling.

BACKGROUND

A vehicle owner with limited knowledge on vehicle diagnosis has to depend solely on experience or intuition in order to predict probable maintenance requirement for her/his vehicle. In order to track progressive degradation of a vehicle especially in absence of multitude of sensors present in various locations of the vehicle, regular visits to a service center or seeking professional help is inevitable. Currently for tracking progressive vehicle degradation, a vehicle is fitted with a multitude of sensors at various locations for example pressure sensors in tires.

The inventors here have recognized several technical problems with such conventional systems, as explained below. The sensors may only be available in expensive high end cars and may not be available in less expensive low end cars. Further to that, a true inference on the state of the vehicle can be made only by an experienced engineer. It is a challenge to track the progressive degradation of a vehicle and predict maintenance schedules well ahead of time without the implementation of a multitude of sensors at various locations of the vehicle.

SUMMARY

Embodiments of the present disclosure present technological improvements as solutions to one or more of the above-mentioned technical problems recognized by the inventors in conventional systems. For example, in one embodiment, a computer implemented method for automatic vehicle maintenance scheduling, the method comprising obtaining acceleration data at a fixed sampling rate of a moving vehicle when the moving vehicle attains at least a pre-determined speed for a pre-determined time from start of the moving vehicle; processing the obtained acceleration data to generate jerk energy values at predetermined intervals; computing speed normalized jerk energy based on an average of the generated jerk energy values and average speed of the moving vehicle; computing a relationship between journey number and the computed speed normalized jerk energy; and computing a vehicle maintenance indicator based on the computed relationship between the journey number and the computed speed normalized jerk energy.

In an embodiment, the relationship between the journey number and the computed speed normalized jerk energy forms a fitted quadratic polynomial.

In an embodiment, the step of computing the vehicle maintenance indicator comprises computing a ratio of: an initial slope of the computed speed normalized jerk energy for a first and a second journey number of the moving vehicle wherein the slope is greater than a pre-determined value; and a current slope of the computed speed normalized jerk energy for a current journey number and an immediate preceding journey number.

In an embodiment, the method described herein above further comprising the step of scheduling vehicle maintenance when the computed vehicle maintenance indicator is greater than a pre-determined threshold.

In an aspect, there is provided a system for automatic vehicle maintenance scheduling, the system comprising: one or more processors; a communication interface device; one or more internal data storage devices operatively coupled to the one or more processors for storing: a data obtaining module, configured to obtain an acceleration data at a fixed sampling rate of a moving vehicle when the moving vehicle attains at least a pre-determined speed for a pre-determined time from start of the moving vehicle; a data processing module, configured to process the obtained acceleration data to generate jerk energy values at predetermined intervals; and a data computation module, configured to: compute speed normalized jerk energy based on an average of the generated jerk energy values and average speed of the moving vehicle; compute a relationship between journey number and the computed speed normalized jerk energy; and compute a vehicle maintenance indicator based on the computed relationship between the journey number and the computed speed normalized jerk energy;

In an embodiment, the system described herein further comprises a storage module for storing the value of average jerk energy and average speed.

In an embodiment, the system described herein further comprises a vehicle maintenance scheduler configured to schedule vehicle maintenance when the computed vehicle maintenance indicator is greater than a pre-determined threshold.

In yet another aspect, there is provided a computer program product for processing data, comprising a non-transitory computer readable medium having program instructions embodied therein for obtaining acceleration data at a fixed sampling rate of a moving vehicle when the moving vehicle attains at least a pre-determined speed for a pre-determined time from start of the moving vehicle; processing the obtained acceleration data to generate jerk energy values at predetermined intervals; computing speed normalized jerk energy based on an average of the generated jerk energy values and average speed of the moving vehicle; computing a relationship between journey number and the computed speed normalized jerk energy; and computing a vehicle maintenance indicator based on the computed relationship between the journey number and the computed speed normalized jerk energy.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

Figure 1:
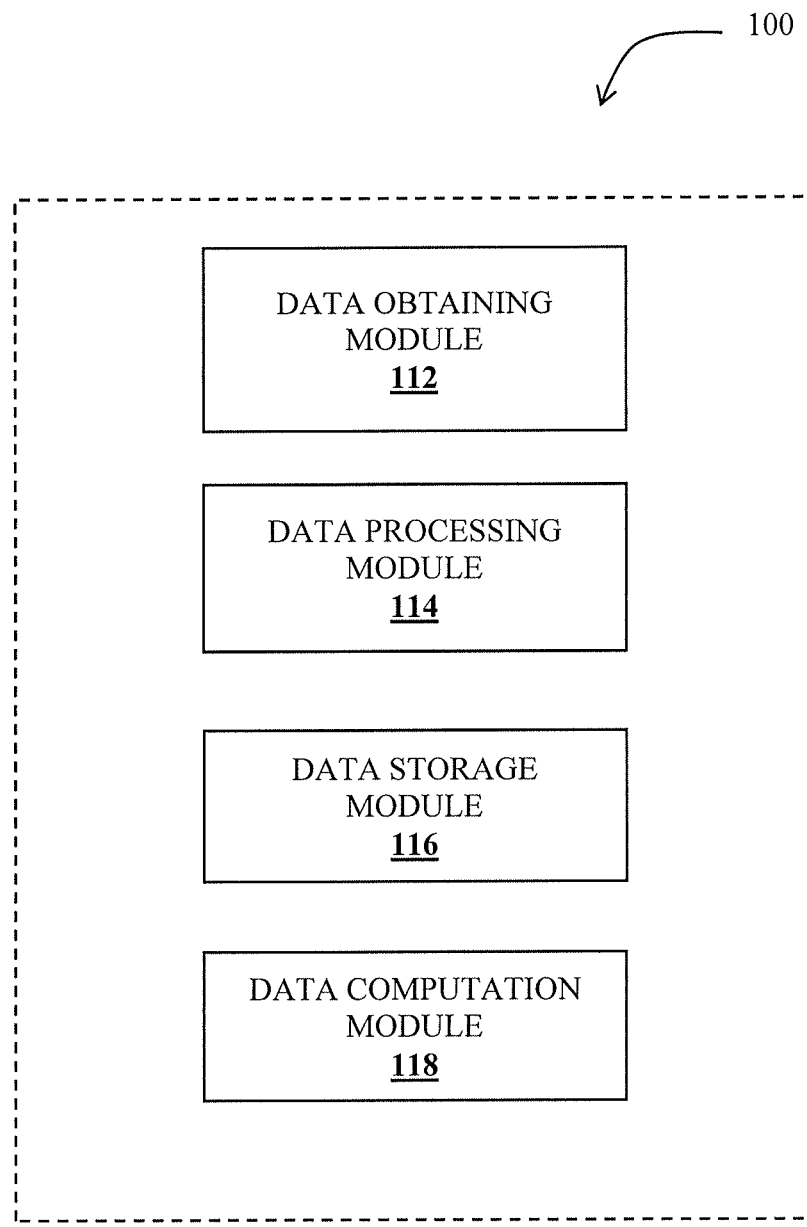
FIG. 1 illustrates an exemplary block diagram of an automatic vehicle maintenance scheduler system with functional modules in accordance with an embodiment of the present disclosure.
Figure 2:
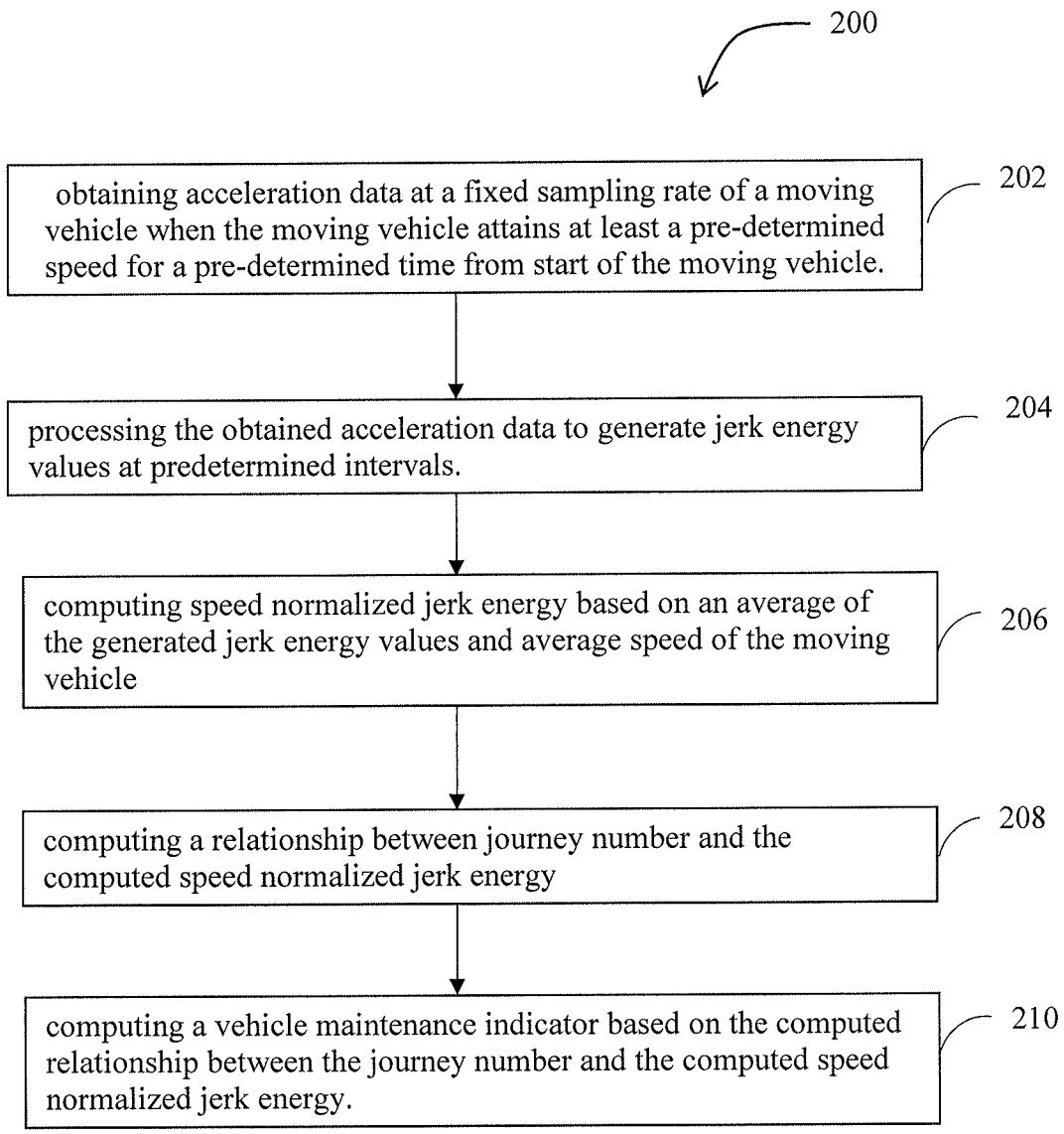
FIG. 2 is an exemplary flow diagram illustrating a computer implemented method for automatic vehicle maintenance scheduling using the system of FIG. 1 in accordance with an embodiment of the present disclosure.

Referring now to the drawings, and more particularly to FIGS. 1 and 2, where similar reference characters denote corresponding features consistently throughout the figures, there are shown preferred embodiments and these embodiments are described in the context of the following exemplary system and method.

FIG. 1 illustrates an exemplary block diagram of an automatic vehicle maintenance scheduler system 100 with functional modules in accordance with an embodiment of the present disclosure and FIG. 2 is an exemplary flow diagram illustrating a computer implemented method for automatic vehicle maintenance scheduling 200 using the system of FIG. 1 in accordance with an embodiment of the present disclosure. In an embodiment, system 100 can reside on one or more computers and include one or more processors (not shown), communication interface device or input/output (I/O) interface (not shown), and memory or one or more internal data storage devices (not shown) operatively coupled to the one or more processors. The one or more internal data—storage devices may be interchangeably referred to as memory or database (client database/server database) in the context of the present disclosure. The one or more processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

In an embodiment, system 100 can be implemented involving a variety of portable computing systems, such as a laptop computer, a notebook, hand-held device and the like. The I/O interface can include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface can include one or more ports for connecting a number of devices to one another or to another server. The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory can include local memory employed during actual execution of program code, bulk storage, and cache memories which provide temporary storage of at least some program code in order to reduce the number of times code must be retrieved from bulk storage during execution. In an embodiment, the various modules of system 100 can be stored in the memory.

Referring now to FIG. 1 and FIG. 2, at step 202 acceleration data of a moving vehicle is obtained at a fixed sampling rate by data obtaining module 112 when the moving vehicle attains at least a pre-determined speed for a pre-determined time from start of the moving vehicle. This ensures that false starts are eliminated and actual movement of the vehicle is considered. When the moving vehicle attains the pre-determined speed for the pre-determined time, the data obtaining module 112 starts functioning by capturing the acceleration data at the fixed sampling rate. In an embodiment the minimum pre-determined speed can be 3 kmph. In an embodiment, the minimum pre-determined time can be more than 300 seconds for the data obtaining module 202 to start functioning. In an embodiment, the acceleration data can be obtained at a fixed sampling rate using dedicated devices such as iDIGI gateway. In an embodiment, the data obtaining module can obtain the acceleration data using sensors/meters such as gyroscope, GPS and magnetometer. In accordance with the present disclosure, the sensors such as gyroscope, GPS and magnetometer can be either part of system 100 or as dedicated devices in the vehicle.

At step 204, data processing module 114, can process the obtained acceleration data to generate jerk energy values at predetermined intervals. In an embodiment, the pre-determined intervals can be of 10 second duration. In an embodiment, the data processing module 114 takes data from the data obtaining module 112. In an embodiment, the acceleration data is obtained at a fixed sampling frequency of 20 Hertz. Further, queuing of the acceleration data is done to form a 'data queue' and a data processing thread is initiated. The data processing thread internally reads values of the acceleration data from the 'data queue'. The data processing thread corrects the orientation to calculate acceleration in a vertical axis direction in a vehicle coordinate system. The vertical acceleration is of interest for determining jerk energy values. In an embodiment, the vertical acceleration (in vehicle coordinate system) is used to compute jerk energy from acceleration samples with a window of 1 second, i.e. 20 samples with 50% overlapping. Out of these 20 samples of acceleration 1 jerk energy value is computed. Then for each 10 seconds with 50% overlapping sliding window 19 jerk energy values are computed. The average of these jerk energy values obtained for 10 second duration intervals each with average speed is used as initial micro trip level data. In an embodiment, the average of the jerk energy values is a median of the jerk energy values and the average speed is the median of speed. The values of average jerk energy obtained and average speed are stored in a storage module 116.

At step 206, data computation module 118, computes a speed normalized jerk energy based on an average of the generated jerk energy values and average speed of the moving vehicle. In an embodiment, speed normalized jerk is the ratio of average jerk energy value and average speed. The speed normalized jerk energy is computed for each completed journey of the moving vehicle and stored. A counter (not shown) counts the journey number. At step 208, data computation module 118, computes a relationship between the speed normalized jerk energy and the journey number. In an embodiment, a relationship between journey number denoted by 'x' and speed normalized jerk energy denoted by 'NJ' is obtained as a fitted quadratic polynomial equation. For example, let p(x)=NJ where p(x) is the fitted quadratic polynomial equation and p(x) is updated after each journey by the data computation module 118.

At step 210, the data computation module 118, computes a vehicle maintenance indicator based on the computed relationship between the journey number and the computed speed normalized jerk energy. In an embodiment, the journey number should be of a minimum number for example 10 journeys for the data computation module 118 to compute the vehicle maintenance indicator. The step of computing the vehicle maintenance indicator comprises computing a ratio of: an initial slope of the computed speed normalized jerk energy for a first and a second journey number of the moving vehicle wherein the slope is greater than a pre-determined value; and a current slope of the computed speed normalized jerk energy for a current journey number and an immediate preceding journey number. The initial slope of the computed speed normalized jerk energy for a first and a second journey number of the moving vehicle wherein the slope is greater than a pre-determined value can be denoted as: delPinitial=max{(p(2)−p(1)), 0.20}, where 0.20 is a minimum constant value. The current slope of the computed speed normalized jerk energy for a current journey number and an immediate preceding journey number can be denoted as: delPcurrent=p(Xcurrent)−p(Xcurrent−1).

Hence the vehicle maintenance indicator can be denoted as 'T', where:

$$T = \frac{delP_{current}}{delP_{initial}}$$

In an embodiment, for scheduling vehicle maintenance the computed vehicle maintenance indicator has to be greater than a pre-determined threshold. The pre-determined threshold can be denoted a Tthreshold, wherein if T>Tthreshold, then a flag 1 is raised to indicate that maintenance required. If T<Tthreshold the flag 0 is raised to indicate that maintenance not required. In an embodiment, the Tthreshold value is pre-determined to be 2 for maintenance suggestion. In another embodiment, the Tthreshold value is pre-determined to be 3 for indicating a major breakdown warning of the vehicle. In accordance with the present disclosure, the value of Tthreshold is a configurable parameter. Once maintenance warning is given the system will continue to stay in maintenance required mode. It is required to reset the system once maintenance is done on the vehicle. In yet another embodiment, the driver of the vehicle is given a maintenance warning as well as an alert stating that the journey was rough enough to hasten breakdown of the vehicle.

In an embodiment, the system 100 can be associated with a vehicle identification number for identifying the vehicle for which automatic vehicle maintenance is to be scheduled.

The methods and systems of the present disclosure provide a minimal sensor based approach for progressive degradation of a vehicle. This system is a standalone application which uses on-board diagnostic (OBD) or a dedicated device attached to a vehicle. The sensor as well as computational platform is the same as the OBD or dedicated device. The driver of the vehicle can receive an automatic suggestion if the degradation state of the vehicle becomes alarming. The driver of the vehicle receives an indication of initial or first level maintenance requirement of the vehicle. The methods and systems of the present disclosure provide for a minimal generation of false alarms. The methods and systems disclosed herein is applicable to large fleet management and can be implemented easily without much additional hardware or software investments. The maintenance warning is received at an early point of time for the vehicle, depending on the number of trips so that an early action may be taken on maintaining the vehicle. The driver is given a maintenance warning and also an alert that the journey was rough enough that will hasten the breakdown of the vehicle.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method for automatic vehicle maintenance scheduling, the method comprising:
   obtaining acceleration data at a fixed sampling rate of a moving vehicle when the moving vehicle attains at least a pre-determined speed for a pre-determined time from start of the moving vehicle;

processing the obtained acceleration data to generate kinematic jerk values at predetermined intervals;

computing speed normalized kinematic jerk values based on an average of the generated jerk values and average speed of the moving vehicle;

computing a relationship between journey number and the computed speed normalized kinematic jerk values;

computing a vehicle maintenance indicator based on the computed relationship between the journey number and the computed speed normalized kinematic jerk values;

queuing the obtained acceleration data to form a data queue and initiating a data thread;

correcting an orientation in a vertical axis direction of the moving vehicle to calculate variation in the vertical axis direction of a vehicle coordinate system; and scheduling the vehicle maintenance when the computed vehicle maintenance indicator is greater than a pre-determined threshold.

2. The computer implemented method of claim 1, wherein the step of computing the vehicle maintenance indicator comprises computing a ratio of:

an initial slope of the computed speed kinematic normalized jerk value to a first and a second journey number of the moving vehicle wherein the slope is greater than a pre-determined value.

3. A system for automatic vehicle maintenance scheduling, the system comprising:

one or more internal data storage devices for storing instructions;

one or more processors operatively coupled to the one or more internal data storage device;

the one or more processors being configured by the instructions to:

obtain an acceleration data at a fixed sampling rate of a moving vehicle;

process the obtained acceleration data to generate jerk energy values at predetermined intervals when the moving vehicle attains at least a pre-determined speed for a pre-determined time from start of the moving vehicle;

compute speed normalized kinematic jerk values based on an average of the generated jerk energy values and average speed of the moving vehicle;

compute a relationship between journey number and the computed speed kinematic normalized jerk values;

compute a vehicle maintenance indicator based on the computed relationship between the journey number and the computed speed normalized kinematic jerk values;

queue the obtained acceleration data to form a data queue and initiate a data thread;

correct an orientation in a vertical axis direction of the moving vehicle to calculate variation in the vertical axis direction of a vehicle coordinate system; and schedule the vehicle maintenance when the computed vehicle maintenance indicator is greater than a pre-determined threshold.

* * * * *